United States Patent

[11] 3,586,996

| | | | | |
|---|---|---|---|---|
| [72] | Inventors | Alexandre Milochevitch<br>Saint-Michel-sur-Orge;<br>Andre De La Forest Divonne, Paris, both of,<br>France | [50] | Field of Search.......................................... 331/94.5 |
| [21] | Appl. No. | 779,090 | [56] | References Cited<br>UNITED STATES PATENTS |
| [22] | Filed | Nov. 26, 1968 | 3,431,511  3/1969  Fyler ............................ 331/94.5 |
| [45] | Patented | June 22, 1971 | 3,500,239  3/1970  Frappard et al. .............. 331/94.5 |
| [73] | Assignee | Compagnie Generale D'Electricite<br>Paris, France | Primary Examiner—Roy Lake<br>Assistant Examiner—Darwin R. Hostetter<br>Attorney—Sughrue, Rothwell, Mion, Zinn & Macpeak |
| [32] | Priority | Dec. 1, 1967 | |
| [33] | | France | |
| [31] | | 130,677 | |

[54] MAGNETIC FIELD LASER STRUCTURE
3 Claims, 1 Drawing Fig.

[52] U.S. Cl....................................................... 331/94.5
[51] Int. Cl....................................................... H01s 3/04,
H01s 3/22

ABSTRACT: A gas laser having electromagnetic means to concentrate plasma in the laser tube's capillary and formed by three spaced, coaxial tubes, the inner and first of which defines the capillary, the first and second forming a duct for a cooling fluid and the second and third forming a cooled area for a solenoid.

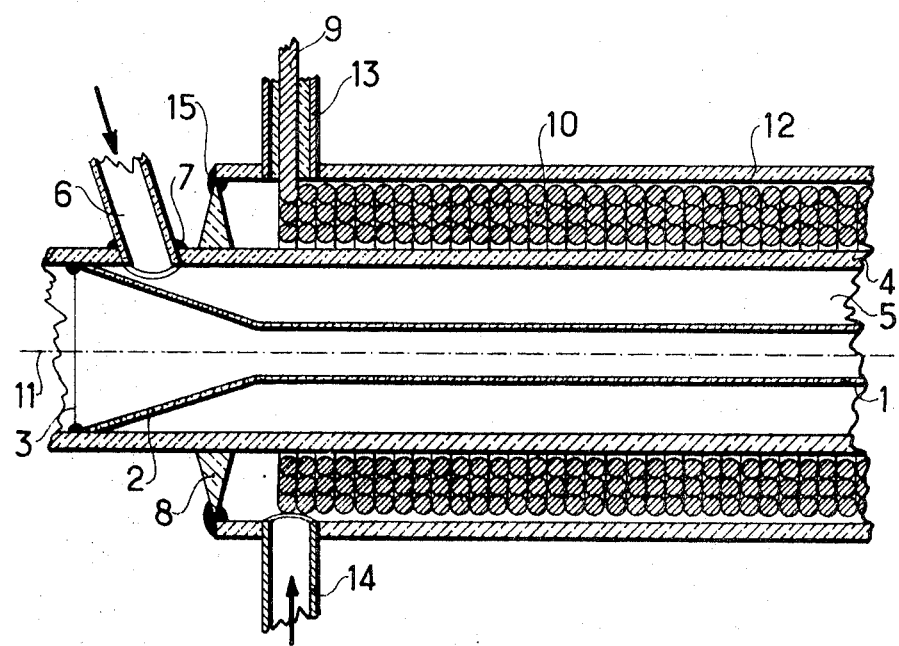

MAGNETIC FIELD LASER STRUCTURE

BACKGROUND OF THE INVENTION

1. Field of the Invention

The present invention concerns gas lasers which incorporate means for creating a magnetic field for the striction of the gas plasma.

2. Description of the Prior Art

Gas lasers are known in which the magnetic field employed to concentrate the plasma in the capillary of the laser tube is created by coils disposed coaxially with the actual laser tube. Lasers are also known in which the capillary and the magnetic coils are cooled by a fluid coolant circulating along the walls of the laser tube and completely immersing the coils.

However, the known laser tubes incorporating a magnetic coil are in the form of a cumbersome assembly which is difficult to handle and can scarcely be employed outside of laboratories.

Mass production of lasers for current industrial use therefore still cannot be envisaged and it is only possible at present to produce a few prototype elements.

SUMMARY OF THE INVENTION

The present invention obviates these disadvantages presented and renders possible the large-scale production of lasers of small overall dimensions which are intended for industrial use.

The present invention relates to a magnetic field laser incorporating electromagnetic means to concentrate the plasma in the capillary of the laser tube. It comprises three coaxial tubes, the first or inner of which constitutes the capillary, while the space between the first and the second constitutes a duct for a cooling fluid, and the space between the second and third constitutes a cooled housing for a solenoid.

The laser according to the invention affords many advantages, such as; the manufacture of the laser tube takes place in combined operations, at the glasswork stage, the laser is of small overall dimensions, the manufacture involves only a minimum number of operations, because the laser consists of elements which are currently commercially obtainable in standardized dimensions. Further, the structure of the laser according to the invention permits very rapid assembly, and the laser has increased rigidity.

BRIEF DESCRIPTION OF THE DRAWINGS

The single FIGURE is an elevation, in section of one end of the laser tube constructed in accordance with the invention.

DESCRIPTION OF THE PREFERRED EMBODIMENT

The laser tube according to the invention is formed of three coaxial tubes formed of "Pyrex," quartz or other like material. The capillary tube 1, which constitutes the laser tube proper, terminates at each end, with a bellmouth or "horn" 2 permitting welding of its portion 3 to the inside surface of a tube 4. A space 5 is thus defined by tubes 1 and 4. A conduit 6 fitted and welded at 7 to the tube 4 constitutes a duct for the admission of a cooling fluid which flows through the space 5. This fluid, such as water, is in direct contact with the wall of the capillary 1, which again is in direct contact with the plasma when the laser is excited by an electric discharge. The outlet duct for the cooling fluid is not shown in the FIGURE but in principle, it is identical to the conduit 6 and disposed at the other end of the laser tube.

Two rings 8 are welded to the outside surface of the tube 4 at each of its ends, these rings being disposed not far from the ducts for the admission and discharge of the cooling fluid, so that the distance between these two rings is shorter than the distance between the said ducts. When these two rings 8 have been welded, an insulated metallic conductor is wound around the tube 4 between the rings 8, thus forming a solenoid 10 whose length is slightly shorter than that of the laser tube. Since the tubes 1 and 4 are coaxial, the axis of the solenoid 10 is coincident with the axis 11 of the laser tube.

When the winding of the solenoid has been completed, the assembly is covered by a third tube 12, the ends of which are welded to the rings 8 at 15. The tube 12 is provided with four conduits, two conduits such as 13 serving as fluidtight outlets for the electrical connecting conductors such as 9, and the conduits such as 14 serving as outlet and inlet ducts for a cooling fluid such as water for cooling the solenoid 10.

It is obvious that there may also be provided a conduit comprising at the same time a fluidtight bushing device for the electric connecting conductor 9 and a duct for supplying the liquid to cool the solenoid.

The conductor 9 includes an insulating coating and the cooling liquid completely washes all the turns of the coil 10. The wall of the tube 4 is at the same time cooled by the fluid flowing through the space 5 and by the fluid flowing through the space between the tube 4 and the tube 12.

Of course, the present invention is in no way limited to the embodiment described and illustrated by way of example in the present application. More particularly modifications may be made in the details, certain features may be changed or certain means may be replaced by equivalent means without departing from the scope of the invention.

What we claim is:

1. In a laser of the type employing electromagnetic means for concentrating the plasma in the capillary of the laser tube, the improvement comprising:
   three spaced coaxial tubes, the first and inner tube constituting the capillary, the first and second tubes forming a duct for receiving a cooling fluid and the second and third tubes forming a cooled housing for a solenoid coil constituting said electromagnetic means, said capillary tube having at least one of its ends, terminating in a bellmouth, said edge of said bellmouth being welded to the inside surface of said second tube,
   rings respectively welded to the outside surface of said second tube and to the ends of said third tube, inwardly of the capillary bellmouth, and
   duct means carried by said second tube and opening up into the space formed between said first and second tubes intermediate of said bellmouth and said rings, whereby said duct means provides for discharge and admission of said cooling fluid.

2. The laser as claimed in claim 1 wherein at least one of said tubes consists of quartz.

3. The laser as claimed in claim 1 wherein at least one of said tubes consists of "Pyrex" glass.